(12) United States Patent
Li et al.

(10) Patent No.: US 10,848,740 B2
(45) Date of Patent: Nov. 24, 2020

(54) THREE-DIMENSIONAL DISPLAY DEVICE AND DISPLAY METHOD

(71) Applicant: Shanghai Tianma Micro-Electronics Co., Ltd., Shanghai (CN)

(72) Inventors: Jialing Li, Shanghai (CN); Yuan Ding, Shanghai (CN); Lei Niu, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 16/455,391

(22) Filed: Jun. 27, 2019

(65) Prior Publication Data

US 2020/0169719 A1 May 28, 2020

(30) Foreign Application Priority Data

Nov. 27, 2018 (CN) .......................... 2018 1 1427518

(51) Int. Cl.
*H04N 13/239* (2018.01)
*G02B 30/00* (2020.01)
(Continued)

(52) U.S. Cl.
CPC ........... *H04N 13/239* (2018.05); *G02B 30/00* (2020.01); *G06T 15/08* (2013.01); *G06T 19/006* (2013.01); *H04N 13/388* (2018.05)

(58) Field of Classification Search
CPC ....... H04N 13/239; G02B 30/00; G06T 15/08
See application file for complete search history.

(56) References Cited

U.S. PATENT DOCUMENTS 5,764,317 A * 6/1998 Sadovnik ............... G02B 30/52
349/5
2008/0117289 A1* 5/2008 Schowengerdt ..... G02B 26/005
348/46
(Continued)

FOREIGN PATENT DOCUMENTS

CN 1918511 A 2/2007
CN 101038371 A 9/2007
(Continued)

OTHER PUBLICATIONS

Lanman, D., & Luebke, D. (2013). Near-eye light field displays. ACM Transactions on Graphics (TOG), 32(6), 1-10.*
(Continued)

*Primary Examiner* — Sarah Lhymn
(74) *Attorney, Agent, or Firm* — Miller, Matthias & Hull LLP

(57) ABSTRACT

Provided is a three-dimensional (3D) display device and display method. The 3D display device includes a zoom lens unit; and a two-dimensional display unit, which is located on a side of the zoom lens unit, where a distance between the two-dimensional display unit and the zoom lens unit is less than a minimum focal length of the zoom lens unit; where the two-dimensional display unit is used for displaying multiple two-dimensional images of a three-dimensional picture, and the multiple two-dimensional images corresponds different depth of field. When the two-dimensional display unit displays the two-dimensional images corresponding to different depth of field, the zoom lens unit has a different focal length for the depth of field corresponding to each of the plurality of two-dimensional images. The display time of the three-dimensional picture is less than visual persistence time.

18 Claims, 8 Drawing Sheets

(51) Int. Cl.
 *G06T 15/08* (2011.01)
 *G06T 19/00* (2011.01)
 *H04N 13/388* (2018.01)

(56) References Cited

U.S. PATENT DOCUMENTS

| | | | | |
|---|---|---|---|---|
| 2008/0231548 | A1* | 9/2008 | Koyama | G09G 3/003 345/6 |
| 2009/0102841 | A1* | 4/2009 | Clavadetscher | H04N 13/275 345/420 |
| 2010/0141802 | A1* | 6/2010 | Knight | H04N 5/23212 348/240.3 |
| 2012/0092586 | A1* | 4/2012 | He | G02B 30/27 349/61 |
| 2014/0035959 | A1* | 2/2014 | Lapstun | G02B 30/10 345/690 |
| 2014/0347361 | A1* | 11/2014 | Alpaslan | G06T 15/50 345/426 |
| 2017/0293259 | A1* | 10/2017 | Ochiai | G03H 1/0005 |
| 2019/0162950 | A1* | 5/2019 | Lapstun | G02B 27/0172 |
| 2019/0166359 | A1* | 5/2019 | Lapstun | H04N 13/307 |
| 2019/0348000 | A1* | 11/2019 | Chen | G09G 5/10 |

FOREIGN PATENT DOCUMENTS

| | | |
|---|---|---|
| CN | 101261369 A | 9/2008 |
| CN | 102692781 A | 9/2012 |
| CN | 107065244 A | 8/2017 |

OTHER PUBLICATIONS

Lin, Y. H., Wang, Y. J., & Reshetnyak, V. (2017). Liquid crystal lenses with tunable focal length. Liquid Crystals Reviews, 5(2), 111-143.*

Chinese Office Action for application No. 201811427518.8; reported on Aug. 27, 2020.

* cited by examiner

THREE-DIMENSIONAL DISPLAY DEVICE AND DISPLAY METHOD

CROSS-REFERENCE TO RELATED APPLICATIONS

This application claims priority to Chinese Patent Application No, 201811427518.8 filed with the Patent Office of the People's Republic of China on Nov. 28, 2018, the disclosure of which is incorporated herein by reference in its entirety.

TECHNICAL FIELD

The present disclosure relates to a display technology and, in particular, to a three-dimensional display device and a display method.

BACKGROUND

The dual-layer display is an existing naked eye three-dimensional (3D) display technology, which employs a structure including two display screens parallel in front and rear. Through the modulation of a brightness ratio of the front and rear screens, the human eye perceives a 3D image at a certain depth between the two screens, that is, depth-fused 3D (DFD) display. The depth position of the 3D image is adjacent to the screen with a larger brightness. The dual-layer display technology demands that the brightness of the two screens cart be adjusted freely and the front screen is transparent.

To achieve the effect of DFD display, pixels of the front and rear screens need overlap well along a projection relation of the observer's eyes, and a limit condition of the depth fusion is that a perspective deviation between the corresponding front and rear pixels is less than 0.08°. The 3D display requires a structure with very high precision and small assembly error, which is difficult to mass produce. In addition, the front screen is difficult to achieve perfect transparency with and thus has interference fringes with the rear screen, which affects the viewing effects.

SUMMARY

Embodiments of the present disclosure provide a 3D display device and display method to achieve a naked eye 3D display, meeting high requirements on front-rear screen alignment, reducing manufacturing difficulty and front-rear screen image interference of the traditional dual-layer display.

In a first aspect, an embodiment of the present disclosure provides a 3D display device, including:

a zoom lens unit; and a two-dimensional display unit, which is located on a side of the zoom lens unit and, where a distance between the two-dimensional display unit and the zoom lens unit is less than a minimum focal length of the zoom lens unit;

where the two-dimensional display unit is used for displaying multiple two-dimensional images of a 3D picture, and the multiple two-dimensional images correspond to different depths of field.

when the two-dimensional display unit displays the two-dimensional images corresponding to different depths of field, the zoom lens unit has a different focal length for the depth of field corresponding to each of the multiple two-dimensional images;

where display time of the 3D picture is less than visual persistence time.

In a second aspect, an embodiment of the present disclosure provides a 3D display method, which is executed by the above 3D display device, including:

controlling a two-dimensional display unit to display a two-dimensional image of a 3D picture; and adjusting a zoom lens unit to a focal length corresponding to depth of field of the two-dimensional image;

where the operations of controlling and adjusting are executed sequentially so that the two-dimensional display unit displays two consecutive two-dimensional images of the 3D picture with different depths of field;

where when the two-dimensional display unit displays a different two-dimensional image, the focal length of the zoom lens unit has a different focal length to achieve the depth of field corresponding to the two-dimensional image; where display time of the 3D picture is less than visual persistence time.

The 3D display device provided by the embodiments of the present disclosure includes a zoom lens unit; and a two-dimensional display unit, which is located on a side of the zoom lens unit, where a distance between the two-dimensional display unit and the zoom lens unit is less than a minimum focal length of the zoom lens unit; where the two-dimensional display unit is used for displaying multiple two-dimensional images of a 3D picture, and the multiple two-dimensional images correspond to different depths of field. When the two-dimensional display unit displays the two-dimensional images corresponding to different depth of field, the zoom lens unit has a different focal length for the depth of field corresponding to each of the multiple two-dimensional images; where display time of the 3D picture is less than visual persistence time. The two-dimensional display unit is placed within a minimum focal length of the zoom lens unit. When the two-dimensional display unit displays the two-dimensional images corresponding to different depth of field of one 3D picture, the zoom lens unit is adjusted to a focal length for the corresponding depth of field, thereby forming virtual images at different depth positions at different times and display time of the 3D picture is less than visual persistence time. Therefore, human eyes will perceive overlapping of multiple virtual images at different depth positions. Furthermore, the brightness ratio between the front and rear virtual images allows virtual images at different depth positions to form a 3D image for naked eyes, and the depth position perceived by the human eyes is close to the virtual image with large brightness. No shadowing exists among the virtual images and no interference fringes will occur to influence the display effect.

DETAILED DESCRIPTION

Figure 1:
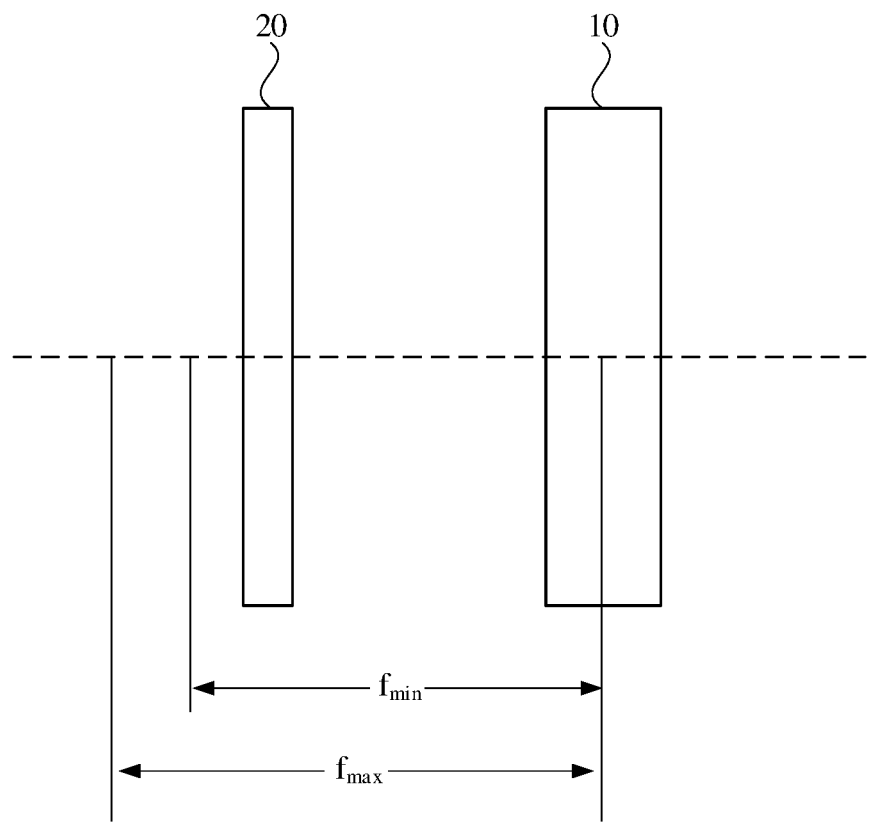
FIG. 1 is a structural diagram of a 3D display device according to an embodiment of the present disclosure.

Hereinafter the present disclosure will be further described in detail in conjunction with the drawings and embodiments. It should be understood that the specific embodiments set forth below are merely intended to illustrate and not to limit the present disclosure. Additionally, it should be noted that, for ease of description, only part, not all, of the structures related to the present disclosure are illustrated in the drawings.

Terms used, in the embodiments of the present disclosure are only used to describe specific embodiments and not intended to limit the present disclosure. It is to be noted that "on", "below", "left" and "right" in the embodiment of the present disclosure is described from the perspective of the drawings, and is not to be construed as limiting the present disclosure. In addition, in context, it should be understood that when a component is formed "on" or "below" another component, it may not only be directly formed "on" or "below" another component, and may also be indirectly formed "on" or "below" another component via a middle component.

The terms "first", and "second" are merely used to describe purpose but not used to describe any order, quantity or significance. For those of ordinary skill in the art, the above terms can be consumed depending on specific contexts.

FIG. 1 is a structural diagram of a 3D display device according to an embodiment of the present disclosure. Referring to FIG. 1, the 3D display device includes a zoom lens unit 10 and a two-dimensional display unit 20. The two-dimensional display unit 20 is located on a side of the zoom lens unit 10. A distance between the two-dimensional display unit 20 and the zoom lens unit 10 is less than a minimum focal length $f_{min}$ of the zoom lens unit 10. The two-dimensional display unit 20 is used for displaying multiple two-dimensional images of a 3D picture, and the multiple two-dimensional images correspond to different depths of field. When the two-dimensional display unit 20 displays the two-dimensional images corresponding to different depths of field, the zoom lens unit 10 has a different focal length for the depth of field corresponding to each of the multiple two-dimensional images. The display time of the 3D picture is less than visual persistence time.

Figure 2:
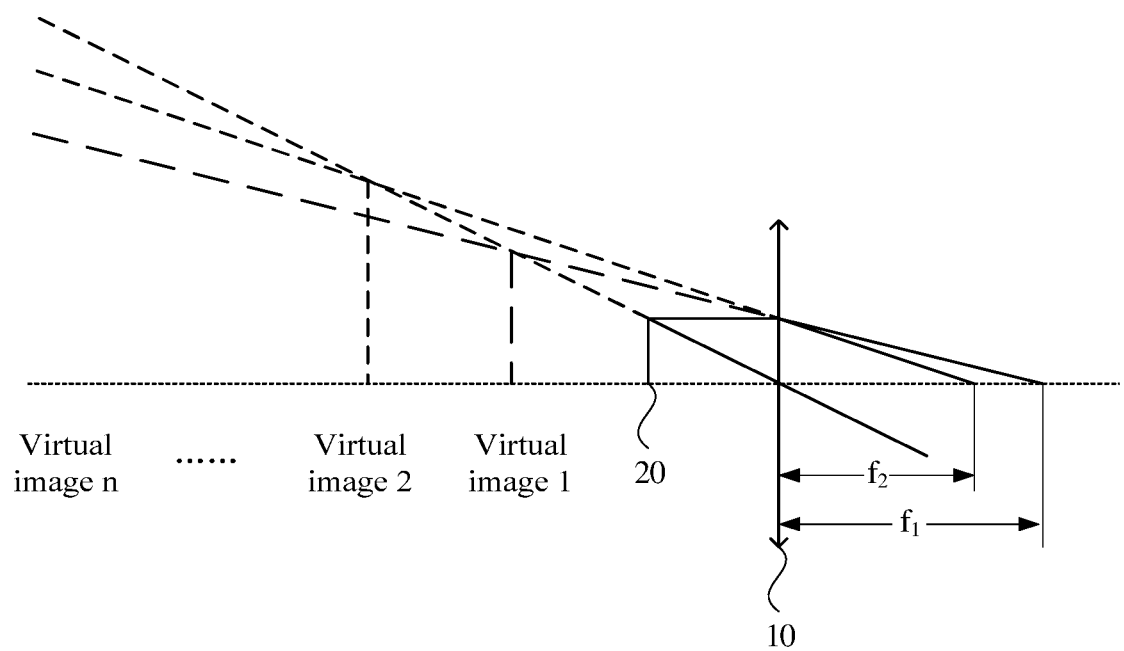
FIG. 2 is a schematic diagram illustrating a light path of a 3D display device according to an embodiment of the present disclosure.

It is to be understood that a distance between an object and a convex lens is less than a focal length, observing from a side of the convex lens away from the object, an upright, magnified virtual image can be seen. When human eyes observe the scenery, ray signals are transmitted to the brain, after a short period of time, the light effect ends, visual images do not disappear immediately, this residual vision is called "afterimage", and such phenomenon is called "visual persistence". Referring to FIG. 1, the zoom lens unit 10 at least includes two different focal lengths, which may be adjusted in a range of $f_{min} \sim f_{max}$. A distance between the two-dimensional display unit 20 and the zoom lens unit 10 is less than $f_{min}$. In an embodiment, a center of the two-dimensional display unit 20 is located on a main optical axis of the zoom lens unit 10, which helps more rays in the two-dimensional images displayed by the two-dimensional display unit 20 to pass through the zoom lens unit 10 and image. This helps to expand a viewing angle for the observer. FIG. 2 is a schematic diagram illustrating a light path of a 3D display device according to an embodiment of the present disclosure. In a time-division mode, when the two-dimensional display unit 20 sequentially displays two-dimensional images of a 3D picture at different times, the zoom lens unit 10 is modulated to a focal length of the depth of field corresponding to each of the multiple two-dimensional images, thereby forming a virtual image 1, a virtual image 2, . . . a virtual image e at different depth positions. Exemplarily, only two focal lengths and two virtual images are shown in FIG. 2. Referring to the light path shown in FIG. 2, corresponding to different focal length, each pixel of various virtual images always keeps a projection zoom relationship, i.e., keeping a good self-alignment overlapping relationship between points (i.e., a line connecting a point on the two-dimensional display unit 20 and a point on each corresponding virtual image passes through a center of the zoom lens unit 10), which allows human eyes to, when seeing layers of the virtual images with modulated brightness, smoothly fuse the layers of the virtual images to obtain sense of depth, thereby having a better 3D image viewing effect. The human eyes can perceive that the 3D image is provided between the virtual image 1 and the virtual image 2, the virtual image 2 and the virtual image 3, . . . the virtual image n−1 and the virtual image n, when the human eyes focus on a certain depth-fused 3D image, an image at such depth is focused on the retina and appears sharp, while images at other depths cannot be focused on the retina and appears blurred, which is similar to watching natural scenes. So, the observer does not so easily feel tired or dizzy. Moreover, unlike the related art in which the dual-layer display employs two different display screens, no shadowing exists among various virtual images and no interference fringes will occur to influence the display effect. Since the front and rear virtual images have a good self-alignment relationship, there is no need to accurately align two display screens, and the process difficulty of the 3D display device is thus reduced.

In the embodiments of the present disclosure, the two-dimensional display unit is placed within a minimum focal length of the zoom lens unit. When the two-dimensional display unit displays the two-dimensional images corresponding to different depth of field of a 3D picture, the zoom lens unit is adjusted to a focal length for the corresponding depth of field, thereby forming virtual images at different depth positions at different times and display time of the 3D picture is less than visual persistence time. Therefore, human eyes will perceive overlapping of multiple virtual images at different depth positions. Furthermore, the brightness ratio between the front and rear virtual images allows virtual images at different depth positions to form 3D images for naked eyes, and the depth position perceived by the human eyes is close to the virtual image with large brightness. No shadowing exists among the virtual images and no interference fringes will occur to influence the display effect.

Figure 3:
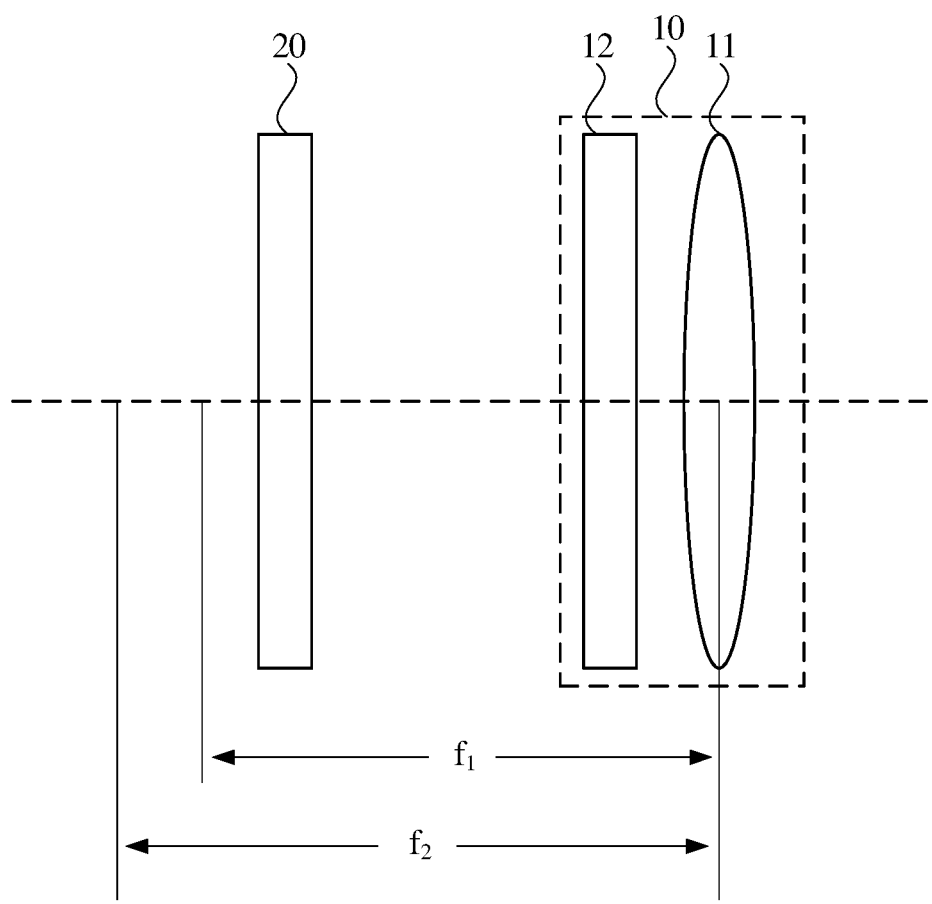
FIG. 3 is a structural diagram of another 3D display device according to an embodiment of the present disclosure.

On the basis of the above, FIG. 3 is a structural diagram of another 3D display device according to an embodiment of the present disclosure. Referring to FIG. 3, in an embodiment, the zoom lens unit 10 includes a liquid crystal zoom lens 11 and a polarization direction switch unit 12. The polarization direction switch unit 12 is located between the liquid crystal zoom lens 11 and the two-dimensional display unit 20 and is used for polarizing a ray incident into the liquid crystal zoom lens 11 in a first direction or a second direction. The first direction is perpendicular to the second direction, and the first direction is a polarization direction of an extraordinary ray when birefringence occurs in a liquid crystal layer in the liquid crystal zoom lens.

Figure 4:
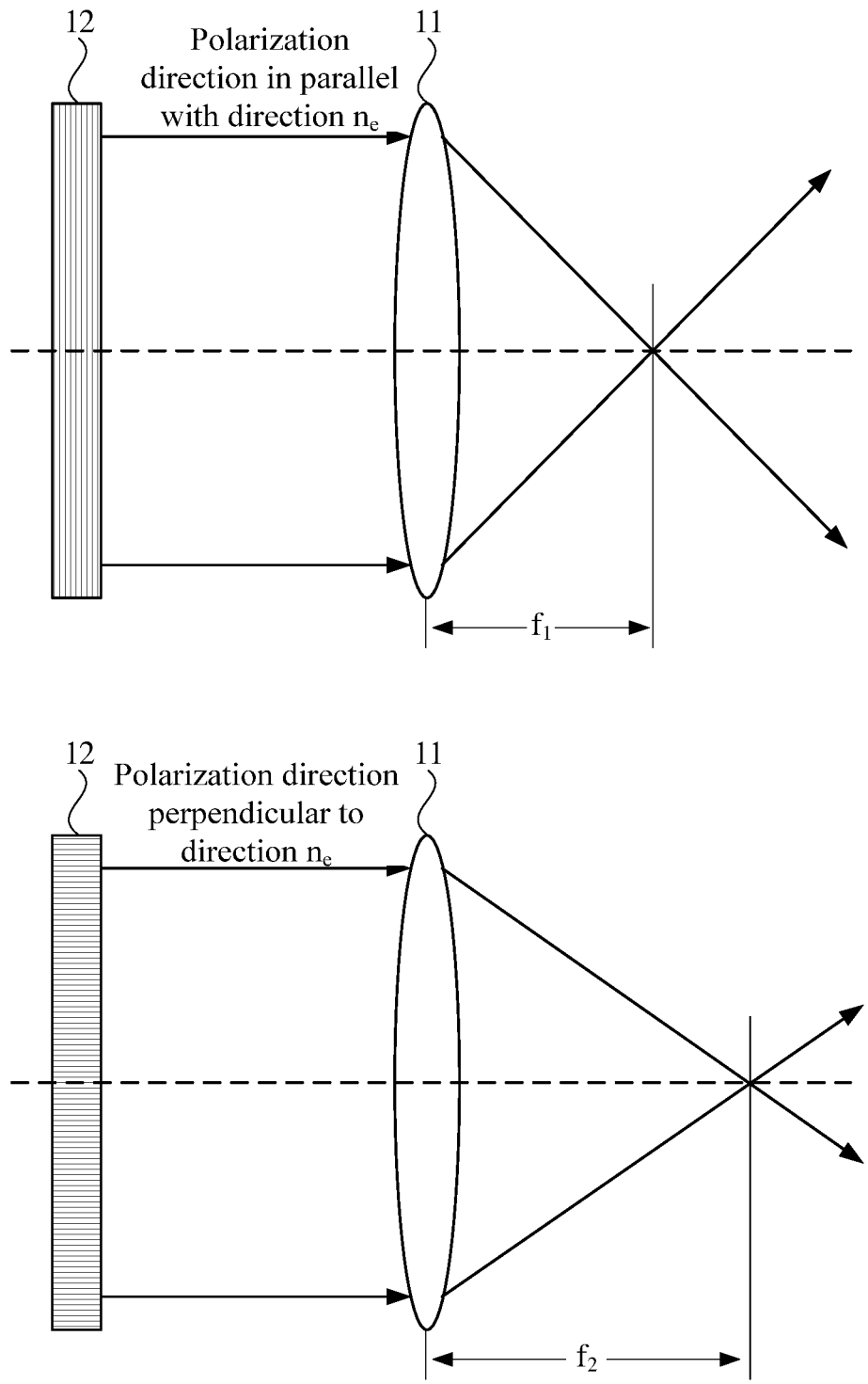
FIG. 4 is a schematic diagram illustrating a light path of a zoom lens unit of the 3D display device shown in FIG. 3.

Exemplarily, the zoom lens unit 10 includes two different focal lengths $f_1$ and $f_2$. Each 3D picture includes two two-dimensional images having depth of field corresponding to $f_1$ and $f_2$ respectively. FIG. 4 is a schematic diagram illustrating a light path of a zoom lens unit of the 3D display device shown in FIG. 3. It is to be understood that the birefringence refers to a phenomenon in which an incident ray produces two refracted rays. The ray incident on anisotropy crystals (such as quartz and calcite) is decomposed into two polarized lights having perpendicular vibration directions and different propagation speeds. A beam satisfying a law of refraction is called an ordinary ray and a beam not satisfying the law of refraction is called an extraordinary ray. Referring to FIG. 4, birefringence occurs when the ray propagates in the liquid crystal. When the polarization direction switch unit 12 modulates the ray incident into the liquid crystal zoom lens 11 to polarize in the first direction (a polarization direction of the extraordinary ray when birefringence occurs in a liquid crystal layer in the liquid crystal zoom lens), the focal length of the liquid crystal zoom lens 11 is $f_1$. When the polarization direction switch unit 12 modulates the ray incident into the liquid crystal zoom lens 11 to polarize in the second direction (which is perpendicular to the first direction), the focal length of the liquid crystal zoom lens 11 is $f_2$. The polarization state of the ray incident into the liquid crystal zoom lens 11 is rapidly switched by the polarization direction switch unit 12, so as to achieve a quick switch of the focal length of the zoom lens unit 10. Moreover, since switch time corresponds to time displaying the two-dimensional images by the two-dimensional display unit 20, a clear 3D image may be observed.

Figure 5:
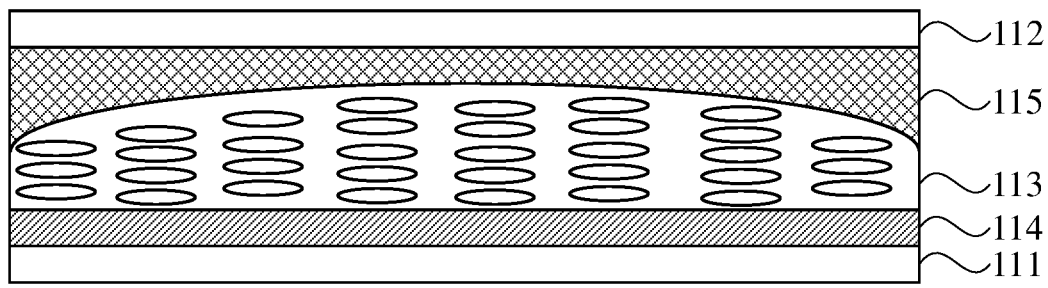
FIG. 5 is a structural diagram of a liquid crystal zoom lens according to an embodiment of the present disclosure.

FIG. 5 is a structural diagram of a liquid crystal zoom lens according to an embodiment of the present disclosure. Referring to FIG. 5, in an embodiment, the liquid crystal zoom lens includes: a first substrate 111 and a second substrate 112, which are disposed opposite to each other; a liquid crystal layer 113, which is located between the first substrate 111 and the second substrate 112; a liquid crystal alignment layer 114, which is located on a side of the first substrate 111 close to the second substrate 122 and is used for enabling liquid crystal molecules of the liquid crystal layer 113 to be arranged in a preset direction; and a lens 115, which is located on a side of the second substrate 112 close to the first substrate 111 and used for enabling the liquid crystal layer 113 to form a lens shape having a light convergence function.

Exemplarily, the lens 115 is made of a transparent material whose refractive index may approximate a refractive index of the ordinary ray or the extraordinary ray when the birefringence occurs in the liquid crystal layer. The lens 115 is used for enabling the liquid crystal layer 113 to form a lens shape having a light convergence function. For example, the lens 115 shown in FIG. 5 has a concave lens shape. It should be noted that, in a specific embodiment, a side in which the first substrate 111 of the liquid crystal zoom lens is located may be adjacent to the polarization direction switch unit 12, and a side of the second substrate 112 of the liquid crystal zoom lens is located may also be adjacent to the polarization direction switch unit 12, which is not limited in the embodiment.

Figure 6:
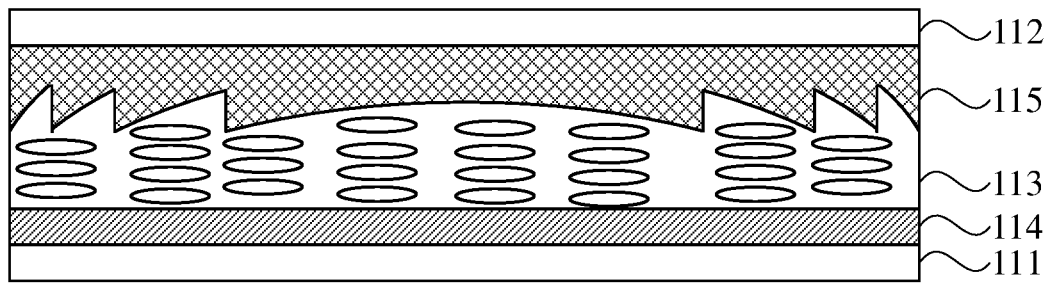
FIG. 6 is a structural diagram of another liquid crystal zoom lens according to an embodiment of the present disclosure.

FIG. 6 is a structural diagram of another liquid crystal zoom lens according to an embodiment of the present disclosure. Referring to FIGS. 5 and 6, the lens 115 is used for enabling the liquid crystal layer 113 to form a convex lens shape or a Fresnel lens shape.

It is to be noted that a surface of the Fresnel lens is a smooth surface, and another surface is constituted by a series of sawtooth grooves. As can be seen from the cross-section shown in FIG. 6, a central part is an ellipse arc. Each groove has a different angle from neighboring grooves, but concentrates rays in one place and forms a central focus, that is, the focus of the lens. Each groove may be seen as a separate lenslet used for adjusting the rays to be parallel or concentrated. The liquid crystal layer 113 is configured to have the Fresnel lens shape. Since the grooves on one side of the Fresnel lens form multiple loops, the focal lengths of the lens formed by respective loops are different, but the focus can be ensured to be at the same point, the effect thereof is equivalent to a thick lens, but it is much smaller than the thick lens, which may effectively eliminate partial aberrations caused by the focus difference due to the lens thickness and also facilitate achieving the slim design.

In an embodiment, a refractive index $n_o$ of the ordinary ray and a refractive index $n_e$ of the extraordinary ray when the birefringence occurs in the liquid crystal layer satisfy $|n_o-n_e| \geq 0.01$.

It should be understood that the larger a difference between the refractive index of the ordinary ray and the refractive index $n_e$ of the extraordinary ray is, the larger a difference between the focal length $f_1$ and $f_2$ of the liquid crystal zoom lens is, the larger the depth of field of the 3D picture is, and the better the display effect is.

Figure 7:
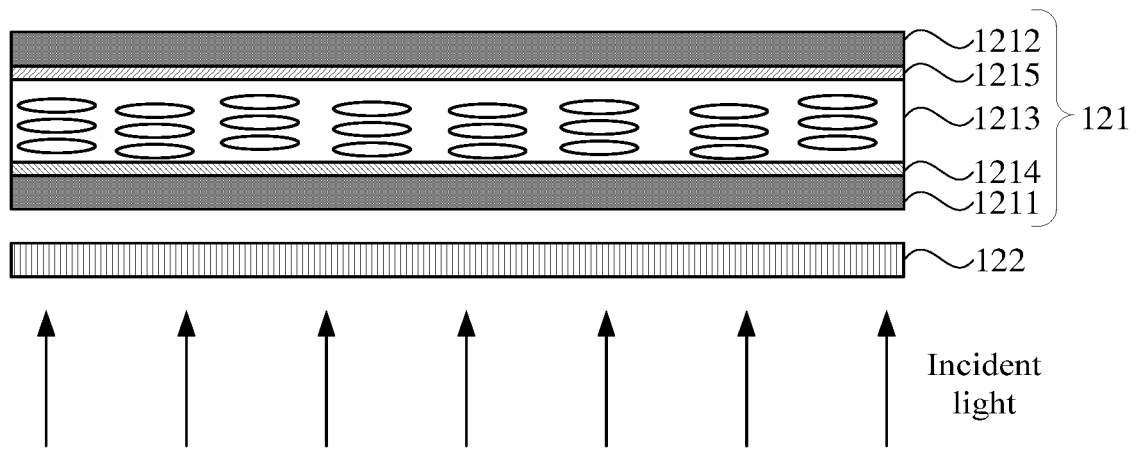
FIG. 7 is a structural diagram of a polarization direction switch unit according to an embodiment of the present disclosure.

FIG. 7 is a structural diagram of a polarization direction switch unit according to an embodiment of the present disclosure. Referring to FIG. 7, in an embodiment, the polarization direction switch unit includes a twisted nematic liquid crystal cell 121 and a polarizer 122. The twisted nematic liquid crystal cell 121 includes: a third substrate 1211 and a fourth substrate 1212, which are parallel to a plane in which the two-dimensional display unit is located; a twisted nematic liquid crystal layer 1213, which is located between the third substrate 1211 and the fourth substrate 1212; a first electrode 1214, which is located on a side of the third substrate 1211; and a second electrode 1215, which is located on a side of the fourth substrate 1212. The polarizer 122 is located on a side of the twisted nematic liquid crystal cell 121 away from the liquid crystal zoom lens.

It should be understood that liquid crystal molecules may twist by 90° when two ends of twisted nematic liquid crystal is applied with voltage or not. Compared with a traditional twisted nematic display panel, the twisted nematic liquid crystal cell 121 in this embodiment removes the polarizer adjacent to a side of the liquid crystal zoom lens. Therefore, when a voltage is applied between the first electrode 1214 and the second electrode 1215, the polarized light in the first direction is output; and when no voltage is applied between the first electrode 1214 and the second electrode 1215, the polarized voltage in the second direction is output. In this way, the focal length of the liquid crystal zoom lens can be changed. Since the polarization direction of the incident polarized light may be switched through the fast response twisted nematic liquid crystal cell, the demand for quickly switching the focal length of the liquid crystal zoom lens can be achieved.

Exemplarily, the polarization direction transmitted by the polarizer 122 may be parallel with the first direction (the polarization direction of the extraordinary ray when birefringence occurs in the liquid crystal layer in the liquid crystal zoom lens). When no voltage is applied between the first electrode 1214 and the second electrode 1215, the liquid crystal molecules in the twisted nematic liquid crystal layer are twisted, and the incident ray is rotated by 90°, the polarized light in the second direction is output (a polarization direction of the ordinary ray when birefringence occurs in the liquid crystal layer in the liquid crystal zoom lens). When the voltage is applied between the first electrode 1214 and the second electrode 1215, under the action of the electric field, all liquid crystal molecules are arranged in parallel and do not rotate the direction of the incident ray. In this case, the polarized light in the first direction is output. It is to be noted that the specific transmissive direction of the polarizer 122 may be the first direction or the second direction as long as the focal length of the liquid crystal zoom lens corresponds to the depth of field of the two-dimensional images displayed by the two-dimensional display unit. The specific configuration is not limited in the embodiment of the present disclosure.

Figure 8:
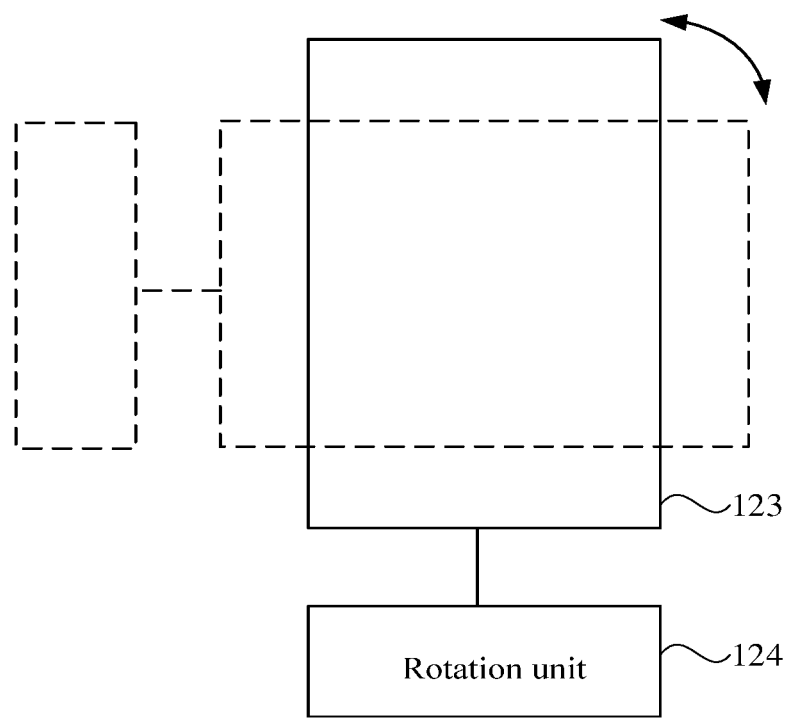
FIG. 8 is a structural diagram of another polarization direction switch unit according to an embodiment of the present disclosure.

FIG. 8 is a structural diagram of another polarization direction switch unit according to an embodiment of the present disclosure. Referring to FIG. 8, in an embodiment, the polarization direction switch unit includes a linear polarizer 123 and a rotation unit 124. The rotation unit 124 is used for rotating the linear polarizer 123 to polarize a ray incident from the linear polarizer 123 into the liquid crystal zoom lens in the first direction or the second direction.

It is to be noted that the polarization direction switch unit may rotate the linear polarizer 123 by means of the rotation unit 124 having a mechanical structure, so as to achieve the adjustment of the polarization direction of the polarized light. The specific structure may be configured according to the actual conditions, which is not limited in the embodiment of the present disclosure.

In an embodiment, the zoom lens unit includes a liquid zoom lens. The liquid zoom lens adjusts the focal length by changing a volume or a shape of liquid in the liquid zoom lens.

Figure 9:
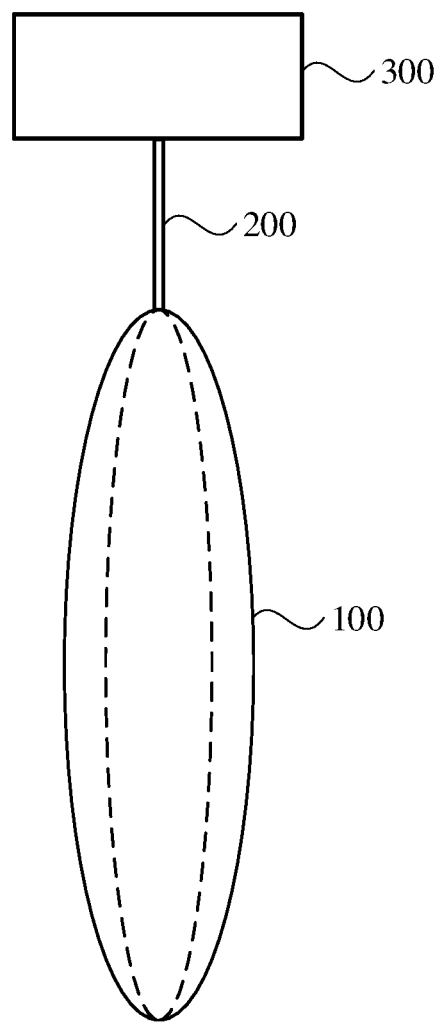
FIG. 9 is a structural diagram of a liquid zoom lens according to an embodiment of the present disclosure.
Figure 10:
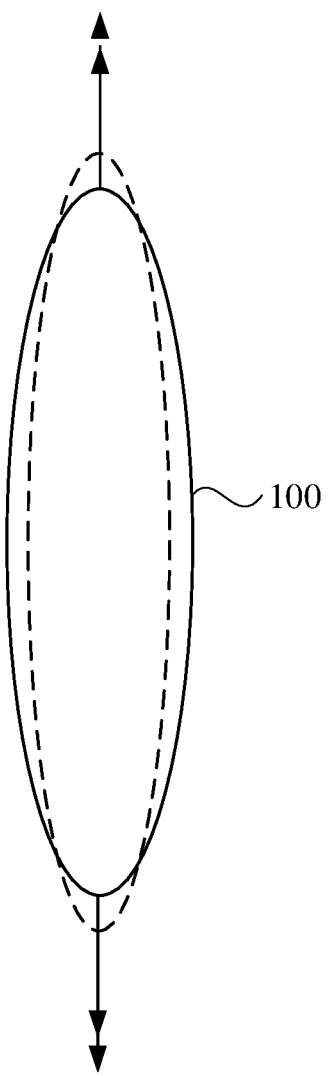
FIG. 10 is a structural diagram of another liquid zoom lens according to an embodiment of the present disclosure.

Exemplarily, FIG. 9 is a structural diagram of a liquid zoom lens according to an embodiment of the present disclosure. Referring to FIG. 9, the liquid zoom lens includes a transparent elastic thin film 100, a microtube 200 and a flow pump 300. The elastic thin film 100 forms a cavity, and the microtube 200 connects the cavity with the flow pump 300. Liquid is injected into the cavity via the microtube 200. The elastic thin film 100 may have a different curvature by changing the volume of the liquid injected in the cavity, thereby adjusting the focal length. FIG. 10 is a structural diagram of another liquid zoom lens according to an embodiment of the present disclosure. Referring to FIG. 10, the liquid zoom lens forms the cavity by the transparent elastic thin film 100. A certain amount of liquid is injected into the cavity, and the shape of the cavity is changed by changing a force stretching the elastic thin film 100, thereby having a different curvature of the elastic thin film 100 and adjusting the focal length.

In an embodiment, the liquid zoom lens includes any one of a liquid zoom lens driven by a mechanical force, a liquid zoom lens driven by fluid pressure, a liquid zoom lens driven by an electromagnetic force or a liquid zoom lens driven by a piezoelectric force.

Exemplarity, the mechanical force driving may be performed by a servo motor. The servo motor rotates to pull the rope and compress the rubber film, so that the lens film is deformed and the focal length is adjusted. The volume or the shape of the liquid may also be changed by the fluid pressure, the electromagnetic force or the piezoelectric force, so as to change the focal length of the liquid zoom lens. The specific driving type may be selected according to the actual conditions.

In an embodiment, the two-dimensional display unit includes any one of a liquid crystal, display (LCD) screen, an organic light-emitting display (OLED) screen, a quantum-dot light-emitting display (QD-LED) screen or a micro-light-emitting diode display screen.

It should be understood that the two-dimensional display unit may be a display device with a display screen. The display screen may be any one of the LED screen, the OLED screen, the QD-LED screen or the micro-light-emitting diode display screen, which is not limited in the embodiment of the present disclosure. It is to be noted that, since the light transmitted by the liquid crystal display screen is polarized light, when the polarization direction switch unit includes the twisted nematic liquid crystal cell and the polarizer, the polarization direction of the light transmitted by the polarizer may be configured to be the same with that of the light transmitted by the liquid crystal display screen, or when the two-dimensional display unit is the liquid crystal display screen, the polarization direction switch unit may not include the polarizer, when the polarization direction switch unit includes the linear polarizer and the rotation unit, the liquid crystal display screen cannot be used because the linear polarizer does not have a rotation function of the twisted nematic liquid crystal cell.

In an embodiment, the zoom lens unit includes at least one zoom lens arranged in parallel.

It should be understood that the same two-dimensional image may include multiple values of depth of field in different parts. To form virtual images corresponding to the depth of field, multiple zoom lenses may be disposed and adjusted to corresponding focal lengths. For example, two zoom lenses are side-by-side arranged, or multiple zoom lenses are au urged in array. The specific arrangement mode may be selected according to the actual situation to achieve a clear 3D display.

In an embodiment, the zoom lens unit and the two-dimensional display unit satisfy $$1 < \frac{f}{u} \leq 1.5.$$

f denotes the focal length of the zoom lens unit, u denote the distance between the two-dimensional display unit and a center of the zoom lens unit.

It should be understood that an object-image formula of the lens is $$\frac{1}{u} + \frac{1}{v} = \frac{1}{f}.$$

u, v and f respectively denotes an object distance, an image distance and a focal length. Table 1 is a set of object-image relationship data (unit: mm) in the embodiment of the present disclosure. In this embodiment, the zoom lens unit and the two-dimensional display unit satisfy $$1 < \frac{f}{u} \leq 1.5.$$

TABLE 1

A set of object-image relationship data

| u | v | f |
|---|---|---|
| 40 | −3000 | 40.54 |
| 40 | −2000 | 40.82 |
| 40 | −1500 | 41.10 |
| 40 | −1000 | 41.67 |
| 40 | −500 | 43.48 |

In an embodiment, the visual persistence time is less than or equal to 0.2 s.

It should be understood that, since an important characteristic of the eyes is visual inertness, i.e., once the light image is formed on the retina, the sense of the light image of the vision will last for a limited time. Such physiological phenomenon is called visual persistence. For a medium-brightness light stimulation, visual persistence time is approximately 0.05 s~0.2 s. The visual persistence time may be slightly different for different people. The display time of a 3D picture is configured to be less than the visual persistence time, so that the observer can observe a consecutive and changing 3D scene when, multiple 3D pictures are played consecutively.

In an embodiment, at least two two-dimensional images with different depth of field corresponding to the 3D picture have different brightness.

It should be understood that, at least two two-dimensional images with different depth of field may form a 3D picture. When observing, the depth of the 3D picture perceived by human eyes is close to the virtual image corresponding to the two-dimensional image with a larger brightness. By controlling the brightness ratio of the two-dimensional image, the depth-fused 3D display is achieved.

Figure 11:
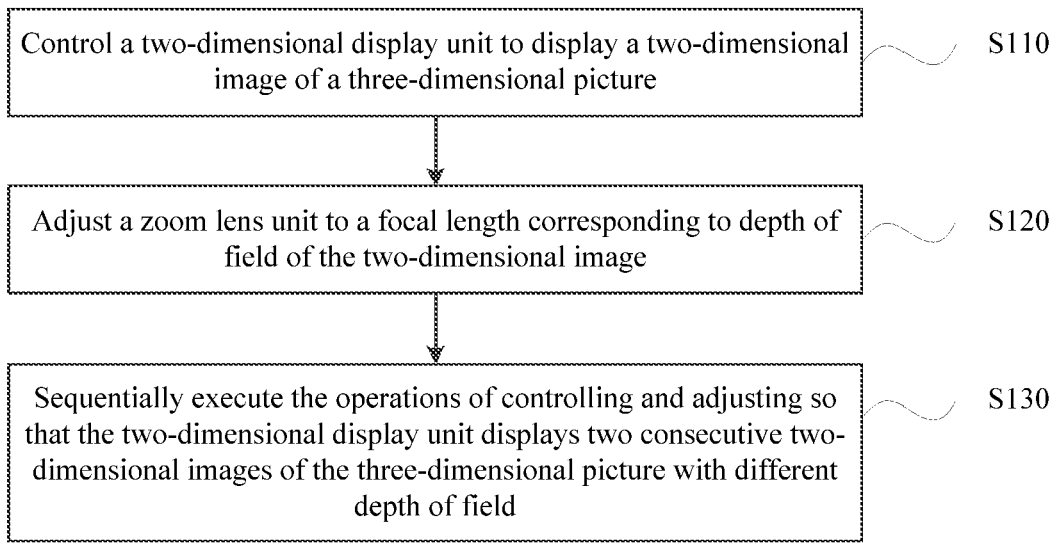
FIG. 11 is a flowchart of a 3D display method according to an embodiment of the present disclosure.

FIG. 11 is a flowchart of a 3D display method according to an embodiment of the present disclosure. The 3D display method provided by the embodiment of the present disclosure is executed by any display device described in the above embodiments. The 3D display method includes the steps described below.

In step S110, a two-dimensional display unit is controlled to display a two-dimensional image of a 3D picture.

In step S120, a zoom lens unit is adjusted to a focal length corresponding to depth of field of the two-dimensional image.

In step S130, the operations of controlling and adjusting are executed sequentially so that the two-dimensional display unit displays two consecutive two-dimensional images of the 3D picture with different depths of field.

When the two-dimensional display unit displays a different two-dimensional image, the zoom lens unit has a different focal length to achieve, the depth of field corresponding to the two-dimensional image. The display time of the 3D picture is less than visual persistence time.

It should be, understood that the 3D picture may include multiple two-dimensional images and each two-dimensional image has a different depth of field. The zoom lens unit includes at least two different focal lengths, which may be adjusted within a range of $f_{min}$~$f_{max}$. A distance between the two-dimensional display unit and the zoom lens unit is less than $f_{min}$. In a time-division mode, when the two-dimensional display unit sequentially displays two-dimensional images of a 3D picture at different times, the zoom lens unit is modulated to a focal length of the depth of field corresponding to each of the multiple two-dimensional images, thereby forming a virtual image 1, a virtual image 2, . . . a virtual image n at different depth positions. Corresponding to different focal length, each pixel of various virtual images always keeps a projection zoom relationship, i.e., keeping a good self-alignment overlapping relationship between points (i.e., a line connecting a point on the two-dimensional display unit and a point on each corresponding virtual image passes through a center of the zoom lens unit), which allows human eyes to, when seeing layers of the virtual images with modulated brightness, smoothly fuse the layers of the virtual images to obtain sense of depth, thereby having a better 3D image viewing effect. Human eyes, can perceive that the 3D image is provided between the virtual image 1 and the virtual image 2, the virtual image 2 and the virtual image 3, . . . the virtual, image n−1 and the virtual image n, when human eyes focus on a certain depth-fused 3D image, an image at such depth is focused on the retina and appears sharp, while images at other depths cannot be focused on the retina and appears blurred, which is similar to watching natural scenes. So the observer does not so easily feel tired or dizzy. Moreover, unlike the related art in which the dual-layer display employs two different display screens, no shadowing exists among various virtual images and no interference fringes will occur to influence the display effect.

In the embodiments of the present disclosure, the two-dimensional display unit is placed within a minimum focal length of the zoom lens unit. When the two-dimensional display unit displays the two-dimensional images corresponding to different depth of field of a 3D picture, the zoom lens unit is adjusted to a focal length for the corresponding depth of field, thereby forming virtual images at different depth positions at different times and display time of the 3D picture is less than visual persistence time. Therefore, human eyes will perceive overlapping of multiple virtual images at different depth positions. Therefore, the brightness ratio between the front and rear virtual images allows virtual images at different depth positions to form a 3D images for naked eyes, and the depth position perceived by human eyes is close to the virtual image with large brightness. No shadowing exists among the virtual images and no interference fringes will occur to influence the display effect.

Figure 12:
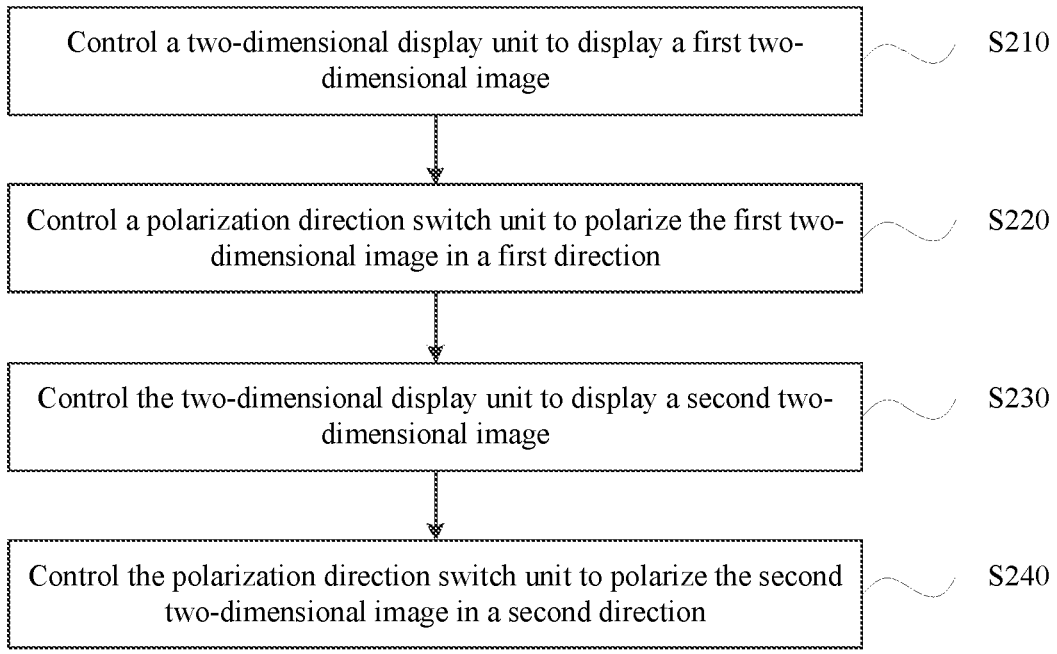
FIG. 12 is a flowchart of another 3D display method according to an embodiment of the present disclosure.

On the basis of the above, FIG. 12 is a flowchart of another 3D display method according to an embodiment of the present disclosure. In an embodiment, the zoom lens unit includes a liquid crystal zoom lens and a polarization direction switch unit. A 3D picture includes a first two-dimensional image and a second two-dimensional image. The 3D picture includes the steps described below.

In step S210, the two-dimensional display unit is controlled to display the first two-dimensional image.

In step S220, the polarization direction switch unit is controlled to polarize the first two-dimensional image in a first direction.

In step S230, the two-dimensional display unit is controlled to display the second two-dimensional image.

In step S240, the polarization direction switch unit is controlled to polarize the second two-dimensional image in a second direction.

The first direction is perpendicular to the second direction, and the first direction is a polarization direction of an extraordinary ray when birefringence occurs in a liquid crystal layer in the liquid crystal zoom lens, the liquid crystal zoom lens has a first focal length for a ray polarized in the first direction and has a second focal length for a ray polarized in the second direction, the first focal length is different from the second focal length; and the display time of the 3D picture is less than the visual persistence time.

Exemplarily, the zoom lens unit includes two different focal lengths $f_1$ and $f_2$. Each 3D picture includes two two-dimensional images having depth of field corresponding to $f_1$ and $f_2$, respectively. The polarization state of the ray incident into the liquid crystal zoom lens is rapidly switched by the polarization direction switch unit, so as to achieve a quick switch of the focal length of the zoom lens unit. Moreover, since switch time corresponds to time displaying the two-dimensional images by the two-dimensional display unit, a clear 3D image may be observed.

In an embodiment, the visual persistence time is less than or equal to 0.2 s.

It should be understood that, since an important characteristic of the eyes is visual inertness, i.e., once the light image is formed on the retina, the sense of the light image of the vision will last for a limited time. Such physiological phenomenon is called visual persistence. For a medium-brightness light stimulation, visual persistence time is approximately 0.05 s~0.2 s. The visual persistence time may be slightly different for different people. The display time of a 3D picture is configured to be less than the visual persistence time, so that the observer can observe a consecutive and changing 3D scene when multiple 3D pictures are played consecutively.

It should be noted that the above are only preferred embodiments of the present disclosure and the technical principles used therein. It will be understood by those skilled in the art that the present disclosure is not limited to the embodiments described herein. Those skilled in the art can make various apparent modifications, adaptations, combinations and substitutions without departing from the scope of the present disclosure. Therefore, while the present disclosure has been described in detail via the above-mentioned embodiments, the present disclosure is not limited to the above-mentioned embodiments and may include other equivalent embodiments without departing from the concept of the present disclosure. The scope of the present disclosure is determined by the scope of the appended claims.

What is claimed is:

1. A three-dimensional (3D) display device, comprising:
a zoom lens unit; and
a two-dimensional display unit, which is located on a side of the zoom lens unit, wherein a distance between the two-dimensional display unit and the zoom lens unit is less than a minimum focal length of the zoom lens unit;
wherein the two-dimensional display unit is used for displaying a plurality of two-dimensional images of a three-dimensional picture, and the plurality of two-dimensional images corresponds different depth of field;
when the two-dimensional display unit displays the two-dimensional images corresponding to different depth of field, the zoom lens unit has a different focal length for the depth of field corresponding to each of the plurality of two-dimensional images;
wherein display time of the three-dimensional picture is less than visual persistence time;
wherein the zoom lens unit comprises a liquid crystal zoom lens and a polarization direction switch unit; the polarization direction switch unit is located between the liquid crystal zoom lens and the two-dimensional display unit and is used for polarizing a ray incident into the liquid crystal zoom lens in a first direction or a second direction;
wherein the first direction is perpendicular to the second direction, and the first direction is a polarization direction of an extraordinary ray when birefringence occurs in a liquid crystal layer in the liquid crystal zoom lens;
wherein the polarization direction switch unit comprises:
a twisted nematic liquid crystal cell, which comprises:
a third substrate and a fourth substrate which are parallel to a plane in which the two-dimensional display unit is located;
a twisted nematic liquid crystal layer, which is located between the third substrate and the fourth substrate;
a first electrode, which is located on a side of the third substrate; and
a second electrode, which is located on a side of the fourth substrate; and
a polarizer, which is located on a side of the twisted nematic liquid crystal layer cell away from the liquid crystal zoom lens.

2. The 3D display device of claim 1, wherein the liquid crystal zoom lens comprises:
a first substrate and a second substrate, which are disposed opposite to each other;
a liquid crystal layer, which is located between the first substrate and the second substrate;
a liquid crystal alignment layer, which is located on a side of the first substrate close to the second substrate and is used for enabling liquid crystal molecules of the liquid crystal layer to be arranged in a preset direction; and
a lens, which is located on a side of the second substrate close to the first substrate and used for enabling the liquid crystal layer to form a lens shape having a light convergence function.

3. The 3D display device of claim 2, wherein the lens is used for enabling the liquid crystal layer to form a convex lens shape or a Fresnel lens shape.

4. The 3D display device of claim 1, wherein a refractive index no of an ordinary ray and a refractive index $n_e$ of the extraordinary ray when the birefringence occurs in the liquid crystal layer satisfy $|n_o-n_e|\geq 0.01$.

5. The 3D display device of claim 1, wherein the two-dimensional display unit comprises any one of a liquid crystal display screen, an organic light-emitting display screen, a quantum-dot light-emitting display screen or a micro-light-emitting diode display screen.

6. The 3D display device of claim 1, wherein the zoom lens unit comprises at least one zoom lens disposed in parallel.

7. The 3D display device of claim 1, wherein the visual persistence time is less than or equal to 0.2 s.

8. The 3D display device of claim 1, wherein at least two two-dimensional images with different depth of field of the plurality of two-dimensional images corresponding to the three-dimensional picture have different brightness.

9. A three-dimensional display method, wherein the method is executed by the 3D display device of claim 1, the method comprising:
controlling a two-dimensional display unit to display a two-dimensional image of a three-dimensional picture; and
adjusting a zoom lens unit to a focus length corresponding to depth of field of the two-dimensional image;
wherein the operations of controlling and adjusting are executed sequentially so that the two-dimensional display unit displays two consecutive two-dimensional images of the three-dimensional picture with different depth of field; wherein when the two-dimensional display unit displays a different two-dimensional image, the focus length of the zoom lens unit have a different focus length to achieve the depth of field corresponding to the two-dimensional image; wherein display time of the three-dimensional picture is less than visual persistence time, wherein the zoom lens unit comprises a liquid crystal zoom lens and a polarization direction switch unit; and the three-dimensional picture comprises a first two-dimensional image and a second two-dimensional image; the three-dimensional picture comprises:

controlling the two-dimensional display unit to display the first two-dimensional image;

controlling the polarization direction switch unit to polarize the first two-dimensional image in a first direction;

controlling the two-dimensional display unit to display the second two-dimensional image; and controlling the polarization direction switch unit to polarize the second two-dimensional image in a second direction;

wherein the first direction is perpendicular to the second direction, and the first direction is a polarization direction of an extraordinary ray when birefringence occurs in a liquid crystal layer in the liquid crystal zoom lens, the liquid crystal zoom lens has a first focal length for a ray polarized in the first direction and has a second focus length for a ray polarized in the second direction, the first focus length is different from the second focus length; the display time of the three-dimensional picture is less than the visual persistence time.

10. The 3D display method of claim 9, wherein the visual persistence time is less than or equal to 0.2 s.

11. A three-dimensional (3D) display device, comprising:
a zoom lens unit; and
a two-dimensional display unit, which is located on a side of the zoom lens unit, wherein a distance between the two-dimensional display unit and the zoom lens unit is less than a minimum focal length of the zoom lens unit;
wherein the two-dimensional display unit is used for displaying a plurality of two-dimensional images of a three-dimensional picture, and the plurality of two-dimensional images corresponds different depth of field;
when the two-dimensional display unit displays the two-dimensional images corresponding to different depth of field, the zoom lens unit has a different focal length for the depth of field corresponding to each of the plurality of two-dimensional images;
wherein display time of the three-dimensional picture is less than visual persistence time;
wherein the zoom lens unit and the two-dimensional display unit satisfy $$1 < \frac{f}{u} \le 1.5;$$

wherein f denotes a focus length of the zoom lens unit, u denote a distance between the two-dimensional display unit and a center of the zoom lens unit.

12. The 3D display device of claim 11, wherein the zoom lens unit comprises a liquid crystal zoom lens and a polarization direction switch unit;

the polarization direction switch unit is located between the liquid crystal zoom lens and the two-dimensional display unit and is used for polarizing a ray incident into the liquid crystal zoom lens in a first direction or a second direction;

wherein the first direction is perpendicular to the second direction, and the first direction is a polarization direction of an extraordinary ray when birefringence occurs in a liquid crystal layer in the liquid crystal zoom lens;

wherein the polarization direction switch unit comprises a linear polarizer and a rotation unit, the rotation unit is used for rotating the linear polarizer to polarize aray incident from the linear polarizer into the liquid crystal zoom lens in the first direction or the second direction.

13. The 3D display device of claim 11, wherein the zoom lens unit comprises a liquid zoom lens, the liquid zoom lens is used for adjusting the focal length by changing a volume or a shape of liquid in the liquid zoom lens.

14. The 3D display device of claim 13, wherein the liquid zoom lens comprises any one of a liquid zoom lens driven by a mechanical force, a liquid zoom lens driven by fluid pressure, a liquid zoom lens driven by an electromagnetic force or a liquid zoom lens driven by a piezoelectric force.

15. The 3D display device of claim 11, wherein the two-dimensional display unit comprises any one of a liquid crystal display screen, an organic light-emitting display screen, a quantum-dot light-emitting display screen or a micro-light-emitting diode display screen.

16. The 3D display device of claim 11, wherein the zoom lens unit comprises at least one zoom lens disposed in parallel.

17. The 3D display device of claim 11, wherein the visual persistence time is less than or equal to 0.2 s.

18. The 3D display device of claim 11, wherein at least two two-dimensional images with different depth of field of the plurality of two-dimensional images corresponding to the three-dimensional picture have different brightness.

* * * * *